United States Patent
Agui et al.

(10) Patent No.: US 10,046,285 B2
(45) Date of Patent: Aug. 14, 2018

(54) POLYMER FUNCTIONAL FILM AND METHOD FOR PRODUCING SAME

(71) Applicant: FUJIFILM Corporation, Tokyo (JP)

(72) Inventors: Ryoko Agui, Kanagawa (JP); Masataka Sato, Kanagawa (JP); Keisuke Kodama, Kanagawa (JP); Kazuomi Inoue, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 187 days.

(21) Appl. No.: 14/851,118

(22) Filed: Sep. 11, 2015

(65) Prior Publication Data
US 2016/0001238 A1   Jan. 7, 2016

Related U.S. Application Data

(63) Continuation of application No. PCT/JP2014/058270, filed on Mar. 25, 2014.

(30) Foreign Application Priority Data

Mar. 26, 2013 (JP) ................................ 2013-064669

(51) Int. Cl.
*B01D 71/82* (2006.01)
*C09D 125/18* (2006.01)
(Continued)

(52) U.S. Cl.
CPC .......... *B01D 71/82* (2013.01); *B01D 61/002* (2013.01); *B01D 67/0011* (2013.01);
(Continued)

(58) Field of Classification Search
None
See application file for complete search history.

(56) References Cited

U.S. PATENT DOCUMENTS

| | | | |
|---|---|---|---|
| 4,137,264 A | 1/1979 | Glavis et al. | |
| 2012/0024697 A1* | 2/2012 | Antheunis | B01D 67/009 204/252 |

FOREIGN PATENT DOCUMENTS

| | | |
|---|---|---|
| JP | 52-009092 A | 1/1977 |
| JP | 04-298223 A | 10/1992 |

(Continued)

OTHER PUBLICATIONS

Communication dated Jun. 8, 2016 from the State Intellectual Property Office of the P.R.C. in counterpart application No. 201480012625.8.

(Continued)

*Primary Examiner* — Krishnan S Menon
(74) *Attorney, Agent, or Firm* — Sughrue Mion, PLLC

(57) ABSTRACT

The present invention provides a polymer functional film obtained by polymerizing and curing a composition including (A) a styrene-based monomer represented by Formula (HSM); (B) a crosslinking agent represented by Formula (CL); and (C) a polymerization initiator represented by Formula (PI-1) or (PI-2), and a method for producing the same:

Formula (HSM)

(Continued)

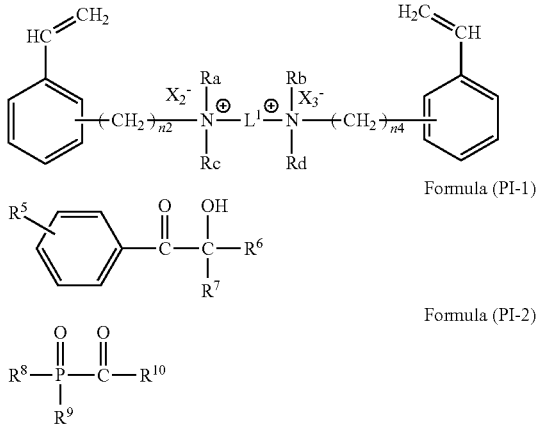

Formula (CL)

Formula (PI-1)

Formula (PI-2)

in which $R^1$ represents a halogen atom or $-N^+(R^2)(R^3)(R^4)(X_1^-)$; n1 represents an integer from 1 to 10; here, $R^2$ to $R^4$ each independently represent a particular substituent; $X_1^-$ represents an organic or inorganic anion;

$L^1$ represents an alkylene group or an alkenylene group; Ra, Rb, Rc and Rd each independently represent a particular substituent; n2 and n4 each independently represent an integer from 1 to 10; $X_2^-$ and $X_3^-$ each independently represent an organic or inorganic anion; and $R^5$ to $R^{10}$ each represent a hydrogen atom or a particular substituent.

15 Claims, 1 Drawing Sheet

(51) Int. Cl.
| | |
|---|---|
| C08F 212/14 | (2006.01) |
| C08F 12/26 | (2006.01) |
| B01D 69/02 | (2006.01) |
| B01D 67/00 | (2006.01) |
| B01D 61/00 | (2006.01) |
| C08F 12/32 | (2006.01) |
| C08F 12/34 | (2006.01) |
| C08F 126/02 | (2006.01) |
| C09D 139/00 | (2006.01) |
| C08F 212/34 | (2006.01) |

(52) U.S. Cl.
CPC .............. *B01D 69/02* (2013.01); *C08F 12/26* (2013.01); *C08F 12/32* (2013.01); *C08F 12/34* (2013.01); *C08F 126/02* (2013.01); *C08F 212/14* (2013.01); *C08F 212/34* (2013.01); *C09D 125/18* (2013.01); *C09D 139/00* (2013.01); *B01D 2323/30* (2013.01); *B01D 2325/14* (2013.01); *B01D 2325/18* (2013.01); *B01D 2325/26* (2013.01); *B01D 2325/28* (2013.01); *B01D 2325/30* (2013.01)

(56) References Cited

FOREIGN PATENT DOCUMENTS

| | | |
|---|---|---|
| JP | 2000-117077 A | 4/2000 |
| JP | 2000-212306 A | 8/2000 |
| JP | 2001-340765 A | 12/2001 |
| JP | 2002-035607 A | 2/2002 |

OTHER PUBLICATIONS

Communication, dated Apr. 12, 2016, from the Japanese Patent Office in counterpart Japanese application No. 2014-060361.
International Preliminary Report on Patentability and Written Opinion, dated Sep. 29, 2015, in corresponding International Application No. PCT/JP2014/058270, 11 pages in English and Japanese.
Toshikatsu Sata et al., "Permselectivity between Two Anions in Anion Exchange Membranes Crosslinked with Various Diamines in Electrodialysis", Journal of Polymer Science Part A: Polymer Chemistry, Jun. 1996, pp. 1475-1482, vol. 34, No. 8.
Toshikatsu Sata, "Studies on Permselectivity between Ions with same Sign through Ion Exchange Membranes in Electrodialysis", Bulletin of the Society of Sea Water Science, 1998, pp. 125-137, vol. 52, No. 3.
Marco Faraj et al., "New Anion Conducting Membranes Based on Functionalized Styrene-Butadiene-Styrene Triblock Copolymer for Fuel Cells Applications", Journal of Polymer Science Part A: Polymer Chemistry, 2011, pp. 3437-3447, vol. 49, No. 15.
International Search Report for PCT/JP2014/058270 dated Jun. 3, 2014.
Foreign Written Opinion for PCT/JP2014/058270 dated Jun. 3, 2014.
Communication dated Mar. 8, 2016 from the European Patent Office in counterpart application No. 14773203.6, 5 pages.

* cited by examiner

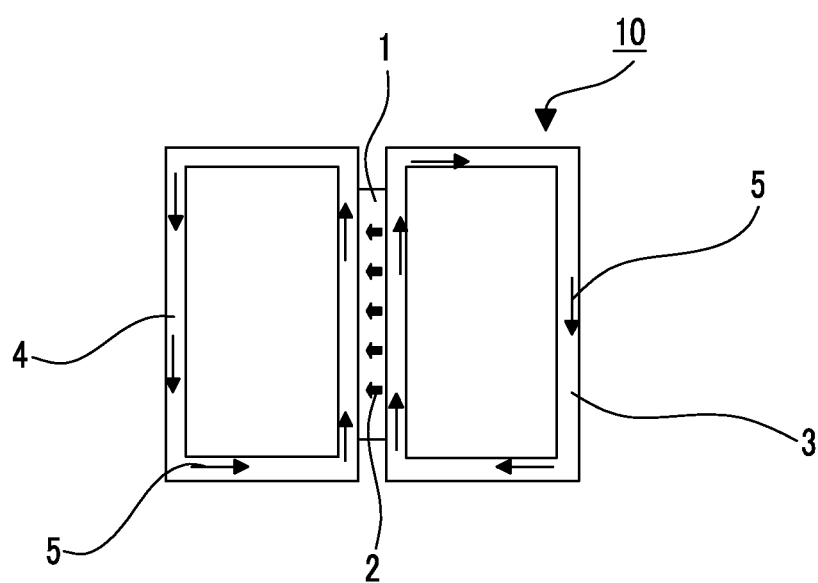

POLYMER FUNCTIONAL FILM AND METHOD FOR PRODUCING SAME

CROSS-REFERENCE TO RELATED APPLICATIONS

This application is a Continuation of PCT International Application No. PCT/JP2014/058270 filed on Mar. 25, 2014, which claims priority under 35 U.S.C. § 119(a) to Japanese Patent Application No. 2013-064669 filed on Mar. 26, 2013. Each of the above application(s) is hereby expressly incorporated by reference, in its entirety, into the present application.

BACKGROUND OF THE INVENTION

1. Field of the Invention

The present invention relates to a polymer functional film which is useful as an ion exchange membrane, a reverse osmosis membrane, a forward osmosis membrane, a gas separation membrane or the like, and to a method for producing the same.

2. Description of the Related Art

Regarding membranes having various functions as functional polymer membranes, an ion exchange membrane, a reverse osmosis membrane, a forward osmosis membrane, a gas separation membrane and the like are known.

For example, an ion exchange membrane is used in electrodeionization (EDI), continuous electrodeionization (CEDI), electrodialysis (ED), electrodialysis reversal (EDR), and the like.

Electrodeionization (EDI) is a water treatment process for removing ions from an aqueous liquid using an ion exchange membrane and electric potential in order to achieve ion transport. Unlike other water purification technologies such as conventional ion exchange, electrodeionization can be used to produce ultrapure water without requiring the use of chemical agents such as acids or caustic soda. Electrodialysis (ED) and electrodialysis reversal (EDR) are electrochemical separation processes of removing ions and the like from water and other fluids.

In regard to ion exchange membranes, research is being conducted on the improvements in electrical resistance of membranes (membrane resistance) (see, for example, Patent Document 1). Patent Document 1 describes an anion exchange membrane which uses a styrene-divinylbenzene copolymer as a crosslinking polymer.

However, JP2000-212306A has descriptions of the improvements in membrane resistance, but does not have descriptions on the coefficient of water permeability that is in a trade-off relationship with the membrane resistance.

SUMMARY OF THE INVENTION

Regarding the anion exchange membrane described in Patent Document 1, it is assumed that since a cross-linked polymer is formed by thermal polymerization and curing, the polymerization curing reaction requires a long time, and the interior of the crosslinked polymer is not uniformly crosslinked. Therefore, it is speculated that water molecules can easily permeate through the anion exchange membrane, and the membrane has a high coefficient of water permeability.

According to the research of the inventors of the present invention, it was found that a conventional polymer functional film which uses a styrene-based monomer has a possibility of remarkably enhancing the function as a polymer functional film by further decreasing the coefficient of water permeability.

An object of the invention is to provide a polymer functional film in which the coefficient of water permeability is suppressed to a low level, and a method for producing the same. Among them, particularly, it is an object of the invention to provide a polymer functional film as an anion exchange membrane, which not only has a low coefficient of water permeability but also has the percentage of water content suppressed to a low level, and which can be used in a variety of applications. Furthermore, it is another object of the invention to provide a method for producing the polymer functional film in a very short time.

In view of the problems described above, the inventors of the present invention conducted a thorough study on a film structure which is appropriate for a polymer functional film. As a result, the inventors found that a polymer functional film produced by subjecting a composition which includes a styrene-based monomer having a particular structure, a crosslinking agent having a particular structure, and the like to a polymerization curing reaction in a short time by irradiating the composition with energy radiation or by heating the composition, has a very low coefficient of water permeability when used as an ion exchange membrane. The invention was achieved based on these findings.

That is, the objects of the invention described above have been achieved by means described below.

<1> A polymer functional film obtained by polymerizing and curing a composition including (A) a styrene-based monomer represented by the following Formula (HSM); (B) a crosslinking agent represented by the following Formula (CL); and (C) a polymerization initiator represented by the following Formula (PI-1) or (PI-2):

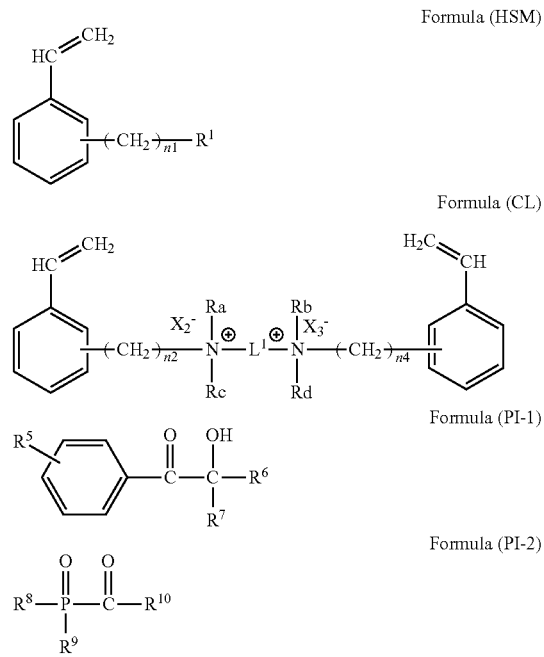

in which in Formula (HSM), $R^1$ represents a halogen atom or $-N^+(R^2)(R^3)(R^4)(X_1^-)$; n1 represents an integer from 1 to 10; here, $R^2$ to $R^4$ each independently represent a linear or branched alkyl group or an aryl group; $R^2$ and $R^3$, or $R^2$, $R^3$ and $R^4$ may be bonded to each other and form an aliphatic heterocyclic ring; and $X_1^-$ represents an organic or inorganic anion;

in Formula (CL), $L^1$ represents an alkylene group or an alkenylene group; Ra, Rb, Rc and Rd each independently represent an alkyl group or an aryl group; Ra and Rb, or/and Rc and Rd may be bonded to each other and form a ring; n2 and n4 each independently represent an integer from 1 to 10; and $X_2^-$ and $X_3^-$ each independently represent an organic or inorganic anion;

in Formula (PI-1), $R^5$ represents a hydrogen atom, an alkyl group, an alkenyl group, an alkoxy group, or an aryloxy group; $R^6$ and $R^7$ each independently represent a hydrogen atom, an alkyl group, an alkenyl group, an alkoxy group, or an aryloxy group; and $R^6$ and $R^7$ may be bonded to each other and form a ring; and in Formula (PI-2), $R^8$ represents an alkyl group, an aryl group, an alkylthio group, or an arylthio group; $R^9$ represents an alkyl group, an aryl group, an alkylthio group, an arylthio group, or an acyl group; and $R^{10}$ represents an alkyl group or an aryl group.

<2> The polymer functional film according to <1>, wherein the composition further includes (D) a polymerization initiator represented by the following Formula (AI):

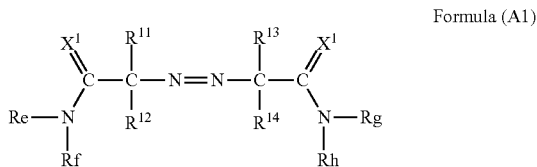

Formula (AI)

in which in Formula (AI), $R^{11}$ to $R^{14}$ each independently represent an alkyl group; $X^1$ represents =O or =N—Ri; Re to Ri each independently represent a hydrogen atom or an alkyl group; and Re and Rf, Rg and Rh, Re and Ri, and Rg and Ri may be respectively bonded to each other and form a ring.

<3> The polymer functional film according to any one of <1> to <3>, in which the content of the (A) styrene-based monomer represented by Formula (HSM) is 1 to 85 parts by mass with respect to 100 parts by mass of the total solid content of the composition.

<4> The polymer functional film according to any one of <1> to <3>, in which the content of the (B) crosslinking agent represented by Formula (CL) is 10 to 98 parts by mass with respect to 100 parts by mass of the total solid content of the composition.

<5> The polymer functional film according to any one of <1> to <4>, in which the content of the (C) polymerization initiator represented by Formula (P1-1) or (P1-2) is 0.1 to 20 parts by mass with respect to 100 parts by mass of the total solid content of the composition.

<6> The polymer functional film according to any one of <2> to <5>, in which the content of the (D) polymerization initiator represented by Formula (AI) is 0.1 to 20 parts by mass with respect to 100 parts by mass of the total solid content of the composition.

<7> The polymer functional film according to any one of <1> to <6>, in which the composition includes (E) a solvent.

<8> The polymer functional film according to <7>, wherein the (E) solvent is water or a water-soluble solvent.

<9> The polymer functional film according to any one of <1> to <8>, including a support.

<10> The polymer functional film according to <9>, in which the support is a synthetic woven fabric, a synthetic nonwoven fabric, a spongy film, or a film having fine through-holes.

<11> The polymer functional film according to <9> or <10>, in which the support is formed of a polyolefin.

<12> The polymer functional film according to any one of <1> to <ii>, in which the polymer functional film is an ion exchange membrane, a reverse osmosis membrane, a forward osmosis membrane, or a gas separation membrane.

<13> A method for producing a polymer functional film, the method including polymerizing and curing a composition including (A) a styrene-based monomer represented by the following Formula (HSM), (B) a crosslinking agent represented by the following Formula (CL), and (C) a polymerization initiator represented by the following Formula (PI-1) or (PI-2):

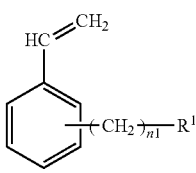

Formula (HSM)

Formula (CL)

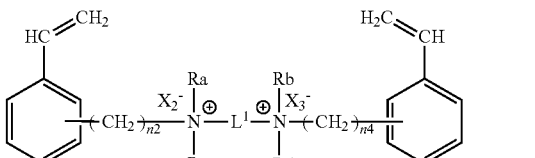

Formula (PI-1)

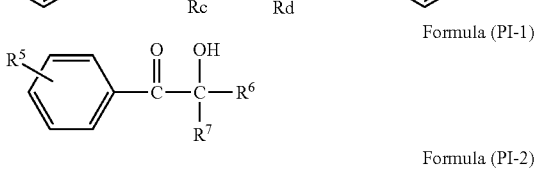

Formula (PI-2)

in which in Formula (HSM), $R^1$ represents a halogen atom or —$N^+(R^2)(R^3)(R^4)(X_1^-)$; n1 represents an integer from 1 to 10; here, $R^2$ to $R^4$ each independently represent a linear or branched alkyl group, or an aryl group; $R^2$ and $R^3$, or $R^2$, $R^3$ and $R^4$ may be bonded to each other and form an aliphatic heterocyclic ring; $X_1^-$ represents an organic or inorganic anion;

in Formula (CL), $L^1$ represents an alkylene group or an alkenylene group; Ra, Rb, Rc and Rd each independently represent an alkyl group or an aryl group; Ra and Rb, or/and Rc and Rd may be bonded to each other and form a ring; n2 and n4 each independently represent an integer from 1 to 10; and $X_2^-$ and $X_3^-$ each independently represent an organic inorganic solvent;

in Formula (PI-1), $R^5$ represents a hydrogen atom, an alkyl group, an alkenyl group, an alkoxy group, or an aryloxy group; $R^6$ and $R^7$ each independently represent a hydrogen atom, an alkyl group, an alkenyl group, an alkoxy group, or an aryloxy group; and $R^6$ and $R^7$ may be bonded to each other and form a ring; and in Formula (PI-2), $R^8$ represents an alkyl group, an aryl group, an alkylthio group, or an arylthio group; $R^9$ represents an alkyl group, an aryl group, an alkylthio group, an arylthio group, or an acyl group; and $R^{10}$ represents an alkyl group or an aryl group.

<14> The method for producing a polymer functional film according to <13>, in which the composition further includes (D) a polymerization initiator represented by the following Formula (AI):

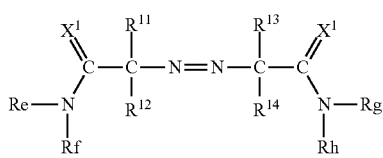

Formula (AI)

in which in Formula (AI), $R^{11}$ to $R^{14}$ each independently represent an alkyl group; $X^1$ represents =O or =N—Ri; Re to Ri each independently represent a hydrogen atom or an alkyl group; and Re and Rf, Rg and Rh, Re and Ri, and Rg and Ri may be respectively bonded to each other and form a ring.

<15> The method for producing a polymer functional film according to <13> or <14>, in which the composition includes (E) a solvent.

<16> The method for producing a polymer functional film according to <15>, in which the (E) solvent is water or a water-soluble solvent.

<17> The method for producing a polymer functional film according to any one of <13> to <16>, comprising; applying the composition on a support, and/or impregnating a support with the composition before polymerizing and curing the composition.

<18> The method for producing a polymer functional film according to any one of <13> to <17>, in which the composition is irradiated with energy radiation or heated to polymerize and cure the composition.

<19> The method for producing a polymer functional film according to any one of <13> to <18>, in which the composition is heated before irradiating the composition with energy radiation, or after irradiating the composition with energy radiation, to polymerize and cure the composition.

According to the present specification, the "pore volume fraction (%)" that is described below refers to a value obtained by measuring the membrane resistance of a polymer functional film (hereinafter, also simply referred to as "film") in NaCl solutions at five different concentrations, and calculating the value by the following equation (b) when the electrical conductivity of the film impregnated with the NaCl solution at each concentration is designated as A (S/cm²), the electrical conductivity per unit film thickness of the NaCl solution at each concentration is designated as B (S/cm²), and the y-intercept obtainable by plotting A on the y-axis and B on the x-axis is designated as C.

Pore volume fraction=$(A-C)/B$ (b)

In regard to the pores according to the invention, since the pores are smaller than the detection limit of standard scanning electron microscopes (SEM), and cannot be detected even if a Jeol JSM-6335 F field emission SEM having a detection limit of 5 nm is used, the average pore size may be considered to be less than 5 nm.

Meanwhile, since the pores are smaller than the detection limit of the SEM, these pores may also be considered to be gaps between atoms. According to the present specification, the "pores" are meant to include those gaps between atoms.

It is speculated that these pores are formed by the solvent, water of neutralization, or salts in the composition for film formation at the time of polymerization and curing of a composition for forming a polymer functional film (hereinafter, referred to as "composition for film formation), or by contraction at the time of polymerization and curing of the composition for film formation. Meanwhile, the conditions for SEM observation are described later.

These pores are voids having arbitrary shapes, which exist in the interior of the polymer functional film, and includes both closed pores and open pores. "Closed pores" are pores that are independent of one another, and may be in contact with any surface of the film. On the other hand, "open pores" refer to pores formed by closed pores being extended. In these open pores, fine pores continue from any one surface of the film to other surface in the form of pathways.

Furthermore, symbol "~" as used in the present specification is used to mean the numerical values described before and after the symbol as a lower limit and an upper limit.

Furthermore, in regard to the various formulas, unless particularly stated otherwise, when there are plural groups under the same symbol, these groups may be identical with or different from each other. Similarly, when there are repetitions of plural partial structures, it is implied that these repetitions may be identical repetitions, or may be a mixture of different repetitions in a defined range.

Unless particularly stated otherwise, the various groups defined in the respective formulas each may further have a substituent, and for example, in the case of an alkyl group and an aryl group, these groups mean an alkyl group which may have a substituent, and an aryl group which may have a substituent.

In addition, in regard to geometric isomers which are substitution modes of double bonds in each formula, as a matter of convenience for indication, even if one of the isomers is described, the geometric isomer may be an E-form or a Z-form, or may be a mixture thereof, unless particularly stated otherwise.

According to the invention, a polymer functional film which acquires an excellent percentage of water content and an excellent coefficient of water permeability by subjecting the component (A) and the component (B) to a polymerization curing reaction by irradiation with energy radiation or the like, and which can be used for a variety of applications, and a method for producing the polymer functional film can be provided. According to the production method of the invention, the polymer functional film can be obtained in a very short time.

The above-described features and other features as well as advantages of the invention will be elucidated from the following description with appropriate reference to the attached drawings.

BRIEF DESCRIPTION OF THE DRAWINGS

FIG. 1 is a schematic diagram of flow paths of an apparatus for measuring the coefficient of water permeability of a film.

DESCRIPTION OF THE PREFERRED EMBODIMENTS

The polymer functional film of the invention (hereinafter, also simply referred to as "film") can be used in order to carry out ion exchange, reverse osmosis, forward osmosis, gas separation, and the like. Hereinafter, preferred embodiments of the invention will be explained by exemplifying the case in which the polymer functional film has a function as an ion exchange membrane.

The polymer functional film of the invention is an anion exchange membrane.

In regard to the thickness of the film of the invention, in the case of having a support, the thickness including the support is preferably 30 to 150 μm, more preferably 60 to 130 μm, and particularly preferably 90 to 110 μm.

The polymer functional film of the invention has an ion exchange capacity of preferably 1.5 meq/g or more, more preferably 2.0 meq/g or more, and particularly preferably 2.5 meq/g or more, based on the total dry mass of the film, an optional porous support, and an optional porous reinforcing material. The upper limit of the ion exchange capacity is not particularly limited; however, a practical upper limit is 7.0 meq/g or less. Here, the unit meq stands for milliequivalent.

The film of the invention has a charge density of preferably 45 meq/m² or more, more preferably 60 meq/m² or more, and particularly preferably 75 meq/m² or more, based on the area of a dried film. The upper limit of the charge density is not particularly limited; however, a practical upper limit is 1,750 meq/m² or less.

Permselectivity for anions such as Cl⁻ of the polymer functional film (anion exchange membrane) of the invention is preferably more than 0.90, more preferably more than 0.93, even more preferably more than 0.95, and particularly preferably closer to 1.0, which is the theoretical value.

The swelling ratio (dimensional change ratio caused by swelling) in water of the polymer functional film of the invention is preferably less than 30%, more preferably less than 15%, and particularly preferably less than 8%. The swelling ratio can be controlled by selecting appropriate parameters in the stage of polymerization and curing.

The electrical resistance, permselectivity, and swelling ratio % in water can be measured by the methods described in Membrane Science, 319, 217-218 (2008), and Masayuki Nakagaki, Maku-gaku Jikken Ho (Experimental Methods in Membranology), pp. 193-195 (1984).

The coefficient of water permeability of the polymer functional film of the invention is preferably less than $7 \times 10^{-5}$ mL/m²/Pa/hr, more preferably $6 \times 10^{-5}$ mL/m²/Pa/hr or less, and particularly preferably $5 \times 10^{-5}$ mL/m²/Pa/hr or less.

The mass average molecular weight of the polymer that constitutes the polymer functional film of the invention is several hundred thousands or more because three-dimensional crosslinking has been formed, and the mass average molecular weight cannot be substantially measured. In general, the mass average molecular weight is considered to be infinite.

The polymer functional film of the invention is formed by polymerizing and curing a composition for film formation which includes (A) a styrene-based monomer represented by Formula (HSM), (B) a crosslinking agent represented by Formula (CL), and (C) a polymerization initiator represented by Formula (PI-1) or (PI-2), as essential components, and optionally further includes (D) a polymerization initiator represented by Formula (AI), (E) a solvent, (F) a polymerization inhibitor, and the like.

Meanwhile, when the word "compound" is used by being appended at the end of a word, or a particular compound is indicated by its name or formula, if the relevant compound has a dissociable partial structure in the chemical structural formula in addition to the compound itself, the term "compound" is used to mean inclusion of salts and ions of the compound. Furthermore, when the word "group" is used by being attached to the word end in connection with a substituent in the present specification, or when a particular compound is called by its name, it is implied that the group or the compound may have an optional substituent.

Hereinafter, the various components of the composition for film formation according to the invention will be explained.

(A) Styrene-based monomer represented by Formula (HSM)

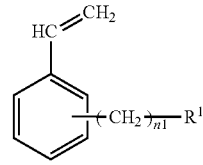

Formula (HSM)

In Formula (HSM), le represents a halogen atom or $-N^+(R^2)(R^3)(R^4)(X_1^-)$. n1 represents an integer from 1 to 10. Here, $R^2$ to $R^4$ each independently represent a linear or branched alkyl group or an aryl group. $R^2$ and $R^3$, or $R^2$, $R^3$ and $R^4$ may be bonded to each other and form an aliphatic heterocyclic ring. $X_1^-$ represents an organic or inorganic anion.

Here, $-(CH_2)_{n1}-R^1$ can be divided into a group represented by the following Formula (ALX) and a group represented by the following Formula (ALA):

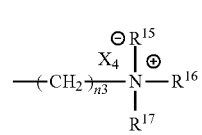

Formula (ALX)

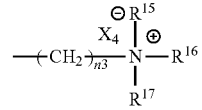

Formula (ALA)

In Formulas (ALX) and (ALA), X represents a halogen atom; $R^{15}$ to $R^{17}$ and $X_4^-$ have the same meanings as $R^2$ to $R^4$ and $X_1^-$ in Formula (HSM), respectively, and preferred ranges thereof are also the same. n3 has the same meaning as n1 in Formula (HSM), and a preferred range thereof is also the same.

In Formula (ALX), X represents a fluorine atom, a chlorine atom, a bromine atom, or an iodine atom, and X is preferably a fluorine atom, a chlorine atom, or a bromine atom; more preferably a chlorine atom or a bromine atom; and particularly preferably a chlorine atom.

n1 in Formula (HSM) and n3 in Formula (ALX) and Formula (ALA) are all preferably 1 or 2, and particularly preferably 1.

In Formulas (HSM) and (ALA), the alkyl group for $R^{15}$ to $R^{17}$ preferably has 1 to 8 carbon atoms, more preferably 1 to 4 carbon atoms, and even more preferably 1 or 2 carbon atoms. Examples of the alkyl group include methyl, ethyl, isopropyl, n-butyl, and 2-ethylhexyl. The alkyl group may have a substituent, and the substituent may be any arbitrary substituent selected from the Sub stituent Group α that will be described below.

The aryl group for $R^{15}$ to $R^{17}$ preferably has 6 to 12 carbon atoms, more preferably 6 to 10 carbon atoms, and even more preferably 6 to 8 carbon atoms. The aryl group may have a substituent, and the substituent may be any arbitrary substituent selected from the Substituent Group α described below. The aryl group is preferably a phenyl group.

Among them, $R^{15}$ to $R^{17}$ are each preferably an alkyl group.

The ring formed by $R^{15}$ and $R^{16}$ being bonded to each other is preferably a 5-membered or 6-membered ring, and examples thereof include a pyrrolidine ring, a piperidine ring, a morpholine ring, a thiomorpholine ring, and a piperazine ring.

Examples of the ring formed by $R^{15}$, $R^{16}$ and $R^{17}$ being bonded to one another include a quinucridine ring and a triethylenediamine ring (1,4-diazabicyclo[2.2.2]octane ring).

In Formulas (HSM) and (ALA), $X_4^-$ represents an organic or inorganic anion; however, an inorganic anion is preferred.

Examples of the organic anion include an alkyl sulfonate anion, an aryl sulfonate anion, and an alkyl or aryl carboxylate anion, and examples thereof include a methane sulfonate anion, a benzene sulfonate anion, a toluene sulfonate anion, and an acetate anion.

Examples of the inorganic anion include a halogen anion, a sulfate dianion, and a phosphate anion, and a halogen anion is preferred. Among halogen anions, a chlorine anion and a bromine anion are preferred, and a chlorine anion is particularly preferred.

Among the groups represented by Formula (ALX) or (ALA), a group represented by Formula (ALA) is preferred.

Here, the Substituent Group α is explained.

The Substituent Group α is a group of substituents consisting of the following substituents.

(Substituent Group α)

Examples of the Substituent Group α include an alkyl group (an alkyl group having preferably 1 to 30 carbon atoms, more preferably 1 to 20 carbon atoms, and particularly preferably 1 to 10 carbon atoms, and examples include methyl, ethyl, isopropyl, t-butyl, n-octyl, 2-ethylhexyl, n-decyl, and n-hexaecyl), a cycloalkyl group (a cycloalkyl group having preferably 3 to 30 carbon atoms, more preferably 3 to 20 carbon atoms, and particularly preferably 3 to 10 carbon atoms, and examples include cyclopropyl, cyclopentyl, and cyclohexyl), an alkenyl group (an alkenyl group having preferably 2 to 30 carbon atoms, more preferably 2 to 20 carbon atoms, and particularly preferably 2 to 10 carbon atoms, and examples include vinyl, allyl, 2-butenyl, and 3-pentenyl), an alkynyl group (an alkynyl group having preferably 2 to 30 carbon atoms, more preferably 2 to 20 carbon atoms, and particularly preferably 2 to 10 carbon atoms, and examples include propargyl and 3-pentynyl), an aryl group (an aryl group having preferably 6 to 30 carbon atoms, more preferably 6 to 20 carbon atoms, and particularly preferably 6 to 12 carbon atoms, and examples include phenyl, p-methylphenyl, naphthyl, and anthranyl), an amino group (including an amino group, an alkylamino group, and an arylamino group; an amino group having preferably 0 to 30 carbon atoms, more preferably 0 to 20 carbon atoms, and particularly preferably 0 to 10 carbon atoms, and examples include amino, methylamino, dimethylamino, diethylamino, dibenzylamino, diphenylamino, and ditolylamino), an alkoxy group (an alkoxy group having preferably 1 to 30 carbon atoms, more preferably 1 to 20 carbon atoms, and particularly preferably 1 to 10 carbon atoms, and examples include methoxy, ethoxy, butoxy, and 2-ethylhexyloxy), an aryloxy group (an aryloxy group having preferably 6 to 30 carbon atoms, more preferably 6 to 20 carbon atoms, and particularly preferably 6 to 12 carbon atoms, and examples include phenyloxy, 1-naphthyloxy, and 2-naphthyloxy), a heterocyclic oxy group (a heterocyclic oxy group having preferably 2 to 30 carbon atoms, more preferably 2 to 20 carbon atoms, and particularly preferably 2 to 12 carbon atoms, and examples include pyridyloxy, pyrazyloxy, pyrimidyloxy, and quinolyloxy), an acyl group (an acyl group having preferably 1 to 30 carbon atoms, more preferably 1 to 20 carbon atoms, and particularly preferably 1 to 12 carbon atoms, and examples include acetyl, benzoyl, formyl, and pivaloyl), an alkoxycarbonyl group (an alkoxycarbonyl group having preferably 2 to 30 carbon atoms, more preferably 2 to 20 carbon atoms, and particularly preferably 2 to 12 carbon atoms, and examples include methoxycarbonyl and ethoxycarbonyl), an aryloxycarbonyl group (an aryloxycarbonyl group having preferably 7 to 30 carbon atoms, more preferably 7 to 20 carbon atoms, and particularly preferably 7 to 12 carbon atoms, and examples include phenyloxycarbonyl), an acyloxy group (an acyloxy group having preferably 2 to 30 carbon atoms, more preferably 2 to 20 carbon atoms, and particularly preferably 2 to 10 carbon atoms, and examples include acetoxy and benzoyloxy), an acylamino group (an acylamino group having preferably 2 to 30 carbon atoms, more preferably 2 to 20 carbon atoms, and particularly preferably 2 to 10 carbon atoms, and examples include acetylamino and benzoylamino), an alkoxycarbonylamino group (an alkoxycarbonylamino group having preferably 2 to 30 carbon atoms, more preferably 2 to 20 carbon atoms, and particularly preferably 2 to 12 carbon atoms, and examples include methoxycarbonylamino), an aryloxycarbonylamino group (an aryloxycarbonylamino group having preferably 7 to 30 carbon atoms, more preferably 7 to 20 carbon atoms, and particularly preferably 7 to 12 carbon atoms, and examples include phenyloxycarbonylamino), an alkyl- or arylsulfonylamino group (having preferably 1 to 30 carbon atoms, more preferably 1 to 20 carbon atoms, and particularly preferably 1 to 12 carbon atoms, and examples include methanesulfonylamino and benzenesulfonylamino), a sulfamoyl group (including a sulfamoyl group, and an alkyl- or arylsulfamoyl group; a sulfamoyl group having preferably 0 to 30 carbon atoms, more preferably 0 to 20 carbon atoms, and particularly preferably 0 to 12 carbon atoms, and examples include sulfamoyl, methylsulfamoyl, dimethylsulfamoyl, and phenylsulfamoyl), a carbamoyl group (including a carbamoyl group, and an alkyl- or arylcarbamoyl group; a carbamoyl group having preferably 1 to 30 carbon atoms, more preferably 1 to 20 carbon atoms, and particularly preferably 1 to 12 carbon atoms, and examples include carbamoyl, methylcarbamoyl, diethylcarbamoyl, and phenylcarbamoyl), an alkylthio group (an alkylthio group having preferably 1 to 30 carbon atoms, more preferably 1 to 20 carbon atoms, and particularly preferably 1 to 12 carbon atoms, and examples include methylthio and ethylthio), an arylthio group (an arylthio group having preferably 6 to 30 carbon atoms, more preferably 6 to 20 carbon atoms, and particularly preferably 6 to 12 carbon atoms, and examples include phenylthio), a heterocyclic thio group (a heterocyclic thio group having preferably 2 to 30 carbon atoms, more preferably 2 to 20 carbon atoms, and particularly preferably 2 to 12 carbon atoms, and examples include pyridylthio, 2-benzimidazolylthio, 2-benzoxazolylthio, and 2-benzothiazolylthio), an alkyl- or arylsulfonyl group (an alkyl- or arylsulfonyl group having preferably 1 to 30 carbon atoms, more preferably 1 to 20 carbon atoms, and particularly preferably 1 to 12 carbon atoms, and examples include mesyl and tosyl), an alkyl- or arylsulfinyl group (an alkyl- or arylsulfinyl group having 1 to 30 carbon atoms, more preferably 1 to 20 carbon atoms, and particularly preferably 1 to 12 carbon atoms, and examples include methanesulfinyl and benzenesulfinyl), a ureido group (a ureido group having preferably 1 to 30 carbon atoms, more preferably 1 to 20 carbon atoms, and particularly preferably 1 to 12 carbon atoms, and examples include ureido, methylureido, and phenylureido), a phosphoric acid amide group (a phosphoric acid amide group having preferably 1 to 30 carbon atoms, more preferably 1 to 20 carbon atoms, and particularly preferably 1 to 12 carbon atoms, and examples include diethylphosphoric acid amide and phenylphosphoric acid amide), a hydroxyl group, a mercapto group, a halogen atom (examples include a fluorine atom, a chlorine atom, a bromine atom, an iodine atom, and more preferred is a fluorine atom), a cyano group, a sulfo group, a carboxyl group, an oxo group, a nitro group, a hydroxamic acid group, a sulfino group, a hydrazino group, an imino group, a heterocyclic group (a heterocyclic group having preferably 1 to 30 carbon atoms, and more preferably 1 to 12 carbon atoms, preferred examples of the ring-constituting heteroatom include a nitrogen atom, an oxygen atom, and a sulfur atom, and specific examples include imidazolyl, pyridyl, quinolyl, furyl, thienyl, piperidyl, morpholino, benzoxazolyl, benzimidazolyl, benzothiazolyl, a carbazolyl group, and an azepinyl group), a silyl group (a silyl group having preferably 3 to 40 carbon atoms, more preferably 3 to 30 carbon atoms, and particularly preferably 3 to 24 carbon atoms, and examples include trimethylsilyl and triphenylsilyl), and a silyloxy group (a silyloxy group having preferably 3 to 40 carbon atoms, more preferably 3 to 30 carbon atoms, and particularly preferably 3 to 24 carbon atoms, and examples include trimethylsilyloxy and triphenylsilyloxy).

These substituents may be further substituted with one or more substituents selected from the Substituent Group α described above.

According to the invention, when there are plural substituents at one structural site, those substituents may be linked to each other and form a ring, or may be condensed with a portion or the entirety of the structural site and form an aromatic ring or an unsaturated heterocyclic ring.

Hereinafter, in regard to Formula (HSM), the styrene-based monomer in a case in which $-(CH_2)_{n1}-R^1$ is a group represented by Formula (ALA) will be referred to as a styrene-based monomer (SM). Here, specific examples of the styrene-based monomer (SM) are listed; however, the invention is not intended to be limited to these.

(SM-1)

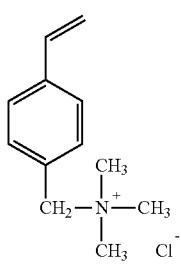

(SM-2)

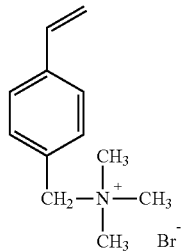

(SM-3)

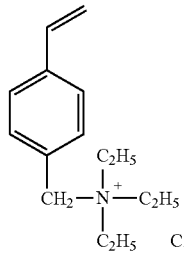

(SM-4)

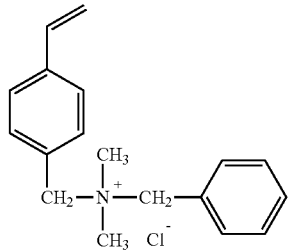

(SM-5)

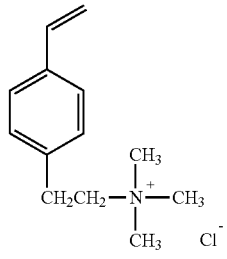

(SM-6)

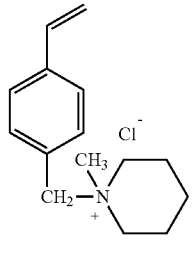

(SM-7)

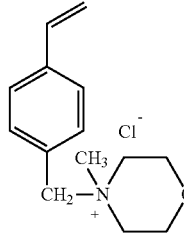

-continued

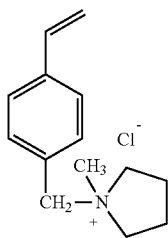
(SM-8)

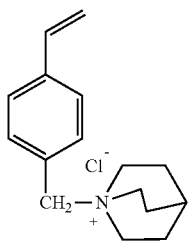
(SM-9)

The compounds represented by Formula (HSM) can be synthesized by the methods described in JP2000-229917A and JP2000-212306A, or methods equivalent thereto. Furthermore, these compounds are also available as commercially available products from Sigma-Aldrich Co., and the like.

For the polymer functional film of the invention, two or more kinds of the (A) styrene-based monomer represented by Formula (HSM) may be used in combination.

According to the invention, the content of the (A) styrene-based monomer represented by Formula (HSM) is preferably 1 to 85 parts by mass, more preferably 1 to 40 parts by mass, and particularly preferably 5 to 35 parts by mass, with respect to 100 parts by mass of the total solid content of the composition for film formation.

(B) Crosslinking agent represented by Formula (CL)

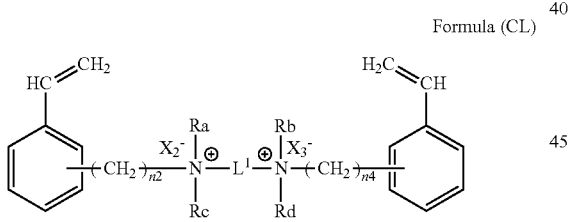
Formula (CL)

In Formula (CL), $L^1$ represents an alkylene group or an alkenylene group. Ra, Rb, Rc and Rd each independently represent an alkyl group or an aryl group, and Ra and Rb, or/and Rc and Rd are bonded to each other and form a ring. n2 and n4 each independently represent an integer from 1 to 10. $X_2^-$ and $X_3^-$ each independently represent an organic or inorganic anion.

The alkylene group for $L^1$ preferably has 2 or 3 carbon atoms, and examples include ethylene and propylene. The alkylene group may have a substituent, and the substituent may be any substituent selected from the Substituent Group α described above.

The alkenylene group for $L^1$ preferably has 2 or 3 carbon atoms, and more preferably has 2 carbon atoms. Among them, an ethenylene group is preferred.

Regarding the alkyl group and aryl group for Ra, Rb, Rc and Rd, the preferred ranges of the alkyl group and the aryl group for $R^2$ to $R^4$ are preferred.

In regard to Ra, Rb, Rc and Rd, among them, an alkyl group is preferred, and methyl is particularly preferred.

Ra and Rb, or/and Rc and Rd may be respectively bonded to each other and form a ring.

It is preferable that Ra and Rb may be bonded to each other and form a piperazine ring or a dihydropyrazine ring together with $L^1$; and it is particularly preferable that in addition to Ra and Rb, Rc and Rd are further bonded to each other and form a triethylenediamine ring (1,4-diazabicyclo [2.2.2]octane ring) together with $L^1$. Furthermore, the ring thus formed may have a substituent, and the substituent may be any substituent selected from the Substituent Group α. Among these, an alkyl group is preferred.

n2 and n4 are each preferably 1 or 2, and 1 is particularly preferred.

$X_2^-$ and $X_3^-$ have the same meanings as $X_1^-$, and preferred ranges thereof are also the same.

Specific examples of the crosslinking agent represented by Formula (CL) are listed below; however, the invention is not intended to be limited to these.

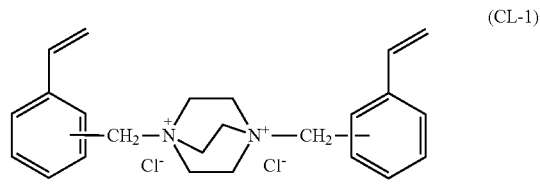
(CL-1)

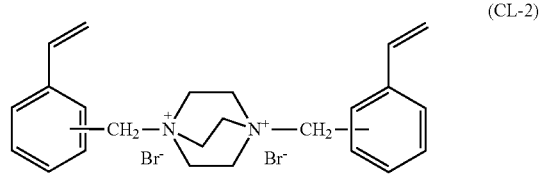
(CL-2)

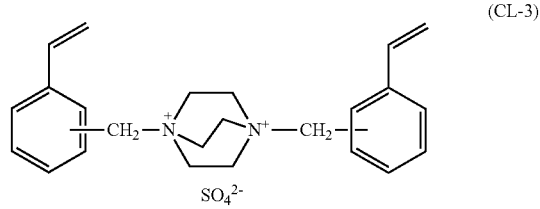
(CL-3)

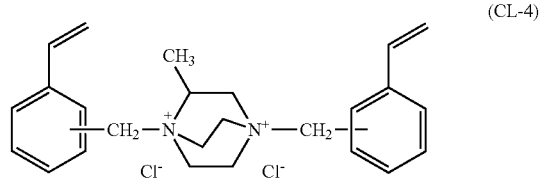
(CL-4)

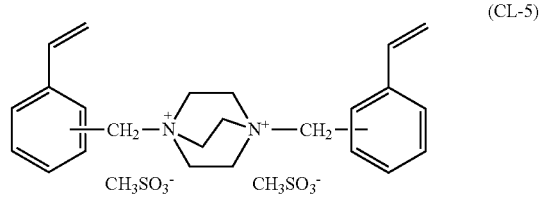
(CL-5)

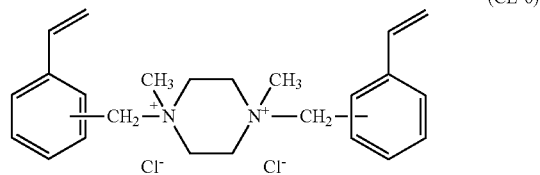
(CL-6)

-continued

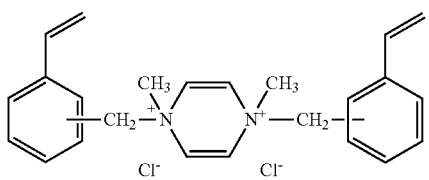
(CL-7)

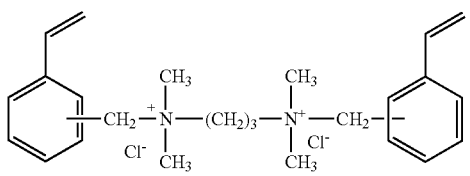
(CL-8)

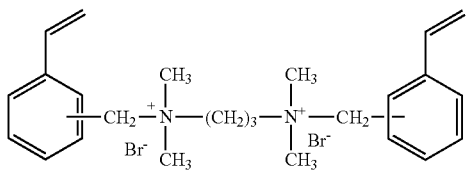
(CL-9)

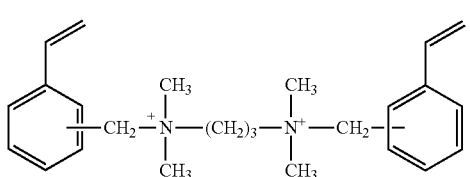
(CL-10)

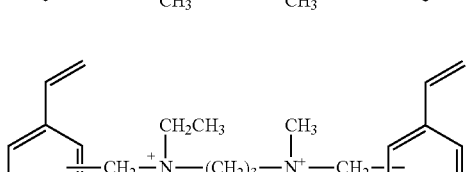
(CL-11)

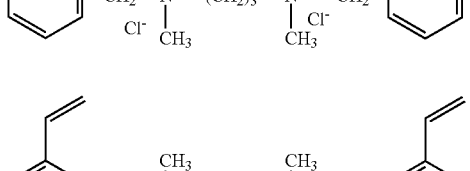
(CL-12)

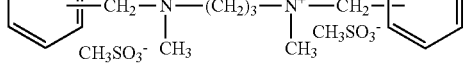

The crosslinking agent represented by Formula (CL) can be synthesized by the method described in JP2000-229917A, or a method equivalent thereto.

For the polymer functional film of the invention, two or more kinds of the (B) crosslinking agent represented by Formula (CL) may be used in combination.

According to the invention, the content of the (B) crosslinking agent represented by Formula (CL) is preferably 10 to 98 parts by mass, more preferably 20 to 80 parts by mass, and particularly preferably 30 to 65 parts by mass, with respect to 100 parts by mass of the total solid content of the composition for film formation.

In regard to the composition for film formation according to the invention, the molar ratio of the (A) styrene-based monomer represented by Formula (HSM) to the (B) crosslinking agent represented by Formula (CL) (number of moles of (A) styrene-based monomer represented by Formula (HSM)/number of moles of (B) crosslinking agent represented by Formula (CL)) is preferably 1/0.1 to 1/20, more preferably 1/0.2 to 1/10, and particularly preferably 1/0.3 to 1/5.

According to the invention, the crosslinking density of the polymer formed when the (A) styrene-based monomer represented by Formula (HSM) reacts with the (B) crosslinking agent represented by Formula (CL), is preferably 0.4 to 2 mmol/g, more preferably 0.5 to 2 mmol/g, and particularly preferably 1.0 to 2 mmol/g.

When the crosslinking density is in the range described above, it is preferable from the viewpoint that the percentage of water content of the film decreases.

(C) Polymerization initiator represented by Formula (PI-1) or (PI-2)

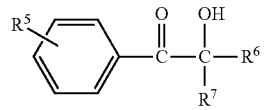
Formula (PI-1)

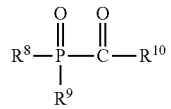
Formula (PI-2)

In Formula (PI-1), $R^5$ represents a hydrogen atom, an alkyl group, an alkenyl group, an alkoxy group, or an aryloxy group; $R^6$ and $R^7$ each independently represent a hydrogen atom, an alkyl group, an alkenyl group, an alkoxy group, or an aryloxy group; and $R^6$ and $R^7$ may be bonded to each other and form a ring.

In Formula (PI-2), $R^8$ represents an alkyl group, an aryl group, an alkylthio group, or an arylthio group; $R^9$ represents an alkyl group, an aryl group, an alkylthio group, an arylthio group, or an acyl group; and $R^{10}$ represents an alkyl group or an aryl group.

$R^5$ is preferably a hydrogen atom, an alkyl group having 1 to 18 carbon atoms, an alkenyl group having 2 to 10 carbon atoms, an alkoxy group having 1 to 10 carbon atoms, or an aryloxy group having 6 to 12 carbon atoms, and the alkyl group, alkenyl group, alkoxy group and aryloxy group may have a substituent. The substituent may be any substituent selected from the Substituent Group α.

The aryl of the aryloxy group is preferably phenyl.

Among them, $R^5$ is preferably a hydrogen atom, an alkyl group having 1 to 4 carbon atoms, or an alkoxy group having 1 to 4 carbon atoms, and in the case of an alkoxy group, a methoxy group and a 2-hydroxyethoxy group are preferred. In the case of an alkyl group, a methyl group substituted with a phenyl group is preferred, and it is also preferable that the phenyl group is substituted with —C(=O)—C($R^6$)($R^7$)(OH), and thereby a methylenebis form is formed by the molecule as a whole.

$R^6$ and $R^7$ are each preferably an alkyl group, an alkenyl group, an alkoxy group, or an aryloxy group. An alkyl group having 1 to 8 carbon atoms, an alkenyl group having 2 to 8 carbon atoms, an alkoxy group having 1 to 8 carbon atoms, and an aryloxy group having 6 to 10 carbon atoms are preferred; an alkyl group is more preferred; and methyl is particularly preferred. The alkyl group, alkenyl group, alkoxy group, and aryloxy group may each have a substituent, and the substituent may be any substituent selected from the Substituent Group α.

The ring formed by $R^6$ and $R^7$ being bonded to each other is preferably a 5-membered or 6-membered ring, and among others, a cyclopentane ring and a cyclohexane ring are preferred.

The alkyl group for $R^5$ and $R^{10}$ is preferably an alkyl group having 1 to 8 carbon atoms, the aryl group for $R^5$ and $R^{10}$ is preferably an aryl group having 6 to 16 carbon atoms, and the aryl group may have a substituent. The substituent may be any substituent selected from the Substituent Group α described above, but an alkyl group and an alkoxy group are preferable.

The alkylthio group or arylthio group for $R^5$ and $R^9$ is preferably an alkylthio group having 1 to 12 carbon atoms, or an arylthio group having 6 to 12 carbon atoms.

The acyl group for $R^9$ is preferably an alkylcarbonyl group or an arylcarbonyl group, and an alkylcarbonyl group having 2 to 12 carbon atoms, or an arylcarbonyl group having 7 to 17 carbon atoms is preferred. Among them, $R^9$ is preferably an arylcarbonyl group, and a phenylcarbonyl group which may have a sub stituent is particularly preferred. The acyl group may have a substituent, and the substituent may be any substituent selected from the Substituent Group α described above.

A polymerization initiator represented by Formula (PI-1) is preferred to a polymerization initiator represented by Formula (PI-2)

Specific examples of the polymerization initiator represented by Formula (PI-1) or (PI-2) are listed below; however, the invention is not intended to be limited to these.

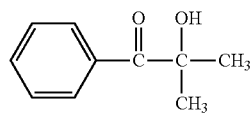
(PI-1-1)

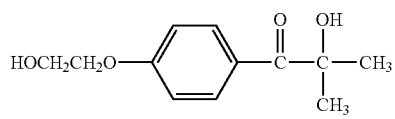
(PI-1-2)

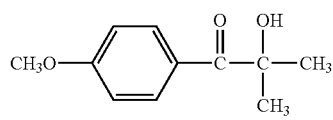
(PI-1-3)

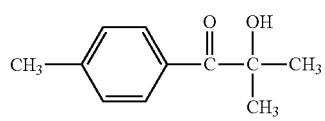
(PI-1-4)

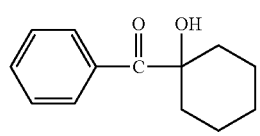
(PI-1-5)

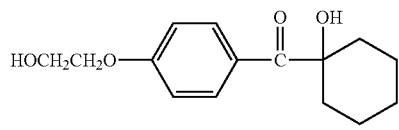
(PI-1-6)

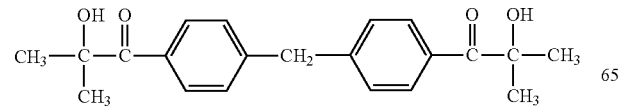
(PI-1-7)

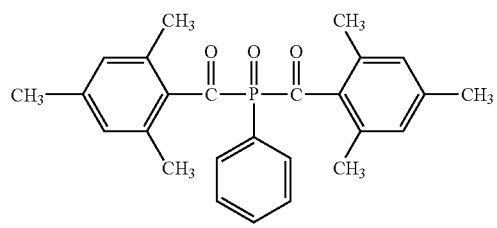
(PI-2-1)

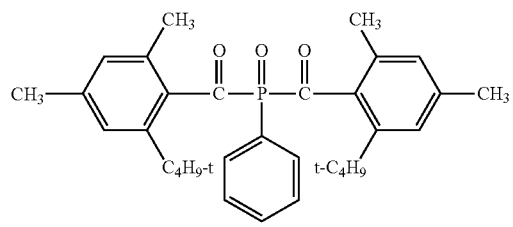
(PI-2-2)

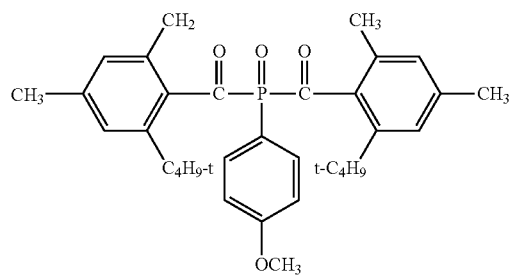
(PI-2-3)

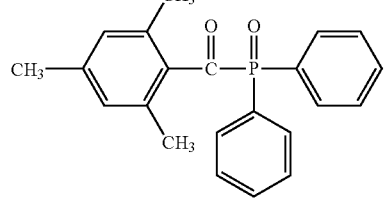
(PI-2-4)

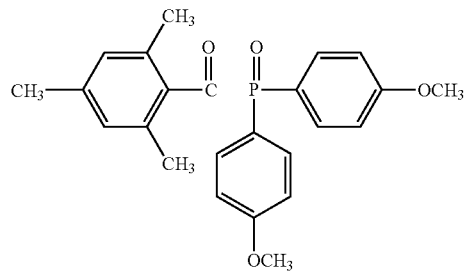
(PI-2-5)

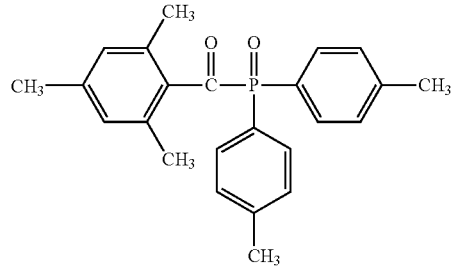
(PI-2-6)

-continued

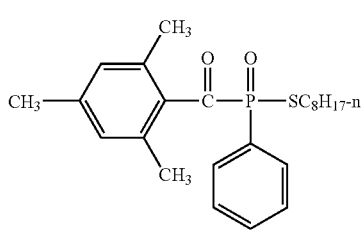
(PI-2-7)

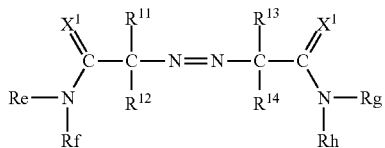
(PI-2-8)

The polymerization initiators represented by Formulas (PI-1) and (PI-2) are available from BASF Japan, Ltd. and the like.

According to the invention, the content of the (C) polymerization initiator represented by Formula (PI-1) or (PI-2) is preferably 0.1 to 10 parts by mass, more preferably 0.1 to 5 parts by mass, and particularly preferably 0.5 to 1 part by mass, with respect to 100 parts by mass of the total solid content of the composition for film formation.

(D) Polymerization initiator represented by Formula (AI)

Formula (AI)

$$\underset{Rf}{\overset{X^1}{\underset{Re-N}{\bigg|}}}C-\underset{R^{12}}{\overset{R^{11}}{\underset{|}{C}}}-N=N-\underset{R^{14}}{\overset{R^{13}}{\underset{|}{C}}}-C\underset{Rh}{\overset{X^1}{\underset{N-Rg}{\bigg|}}}$$

In Formula (AI), $R^{11}$ to $R^{14}$ each independently represent an alkyl group, and $X^1$ represents =O or =N—Ri. Re to Ri each independently represent a hydrogen atom or an alkyl group. Re and Rf, Rg and Rh, Re and Ri, and Rg and Ri may be respectively bonded to each other and form a ring.

The alkyl group for $R^{11}$ to $R^{14}$ and Re to Ri may have a substituent, and the substituent may be any substituent selected from the Substituent Group α. Among them, a hydroxyl group and a carboxyl group are preferred.

The alkyl group for $R^{11}$ to $R^{14}$ preferably has 1 to 8 carbon atoms, and more preferably 1 to 4 carbon atoms, and methyl is particularly preferred.

Re to Ri are each preferably a hydrogen atom, or an alkyl group having 1 to 8 carbon atoms. The ring formed by Re and Rf, Rg and Rh, Re and Ri, or Rg and Ri being respectively bonded to each other is preferably a 5-membered or 6-membered ring.

The ring formed by Re and Ri, or Rg and Ri being bonded to each other is preferably, among them, an imidazoline ring, and the ring formed by Re and Rf, or Rg and Rh being bonded to each other is preferably, among them, a pyrrolidine ring, a piperidine ring, a piperazine ring, a morpholine ring, or a thiomorpholine ring.

$X^1$ is preferably =N—Ri.

Specific examples of the polymerization initiator represented by Formula (AI) are listed below; however, the invention is not intended to be limited to these.

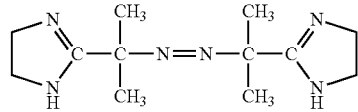
(AI-1)

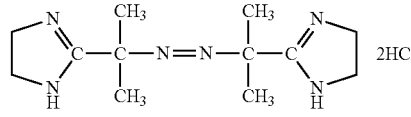
(AI-2)

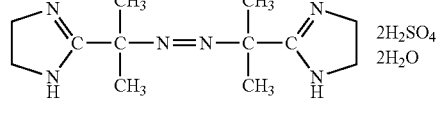
(AI-3)

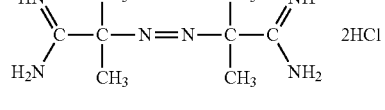
(AI-4)

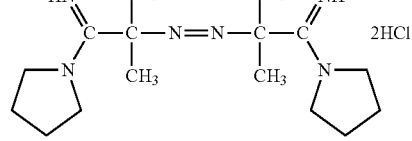
(AI-5)

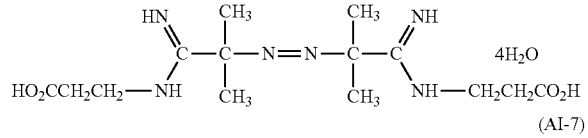
(AI-6)

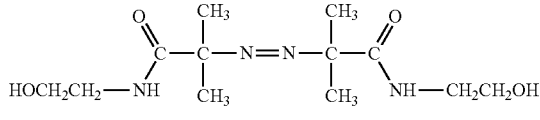
(AI-7)

The polymerization initiator represented by Formula (AI) is available from Wako Pure Chemical Industries, Ltd., and exemplary compound (AI-1) is commercially available as VA-061, exemplary compound (AI-2) as VA-044, exemplary compound (M-3) as VA-046B, exemplary compound (AI-4) as V-50, exemplary compound (M-5) as VA-067, exemplary compound (AI-6) as VA-057, and exemplary compound (AI-7) as VA-086 (all trade names).

According to the invention, the content of the (D) polymerization initiator represented by Formula (AI) is preferably 0.1 to 20 parts by mass, more preferably 0.1 to 5 parts by mass, and particularly preferably 0.1 to 0.5 parts by mass, with respect to 100 parts by mass of the total solid content of the composition for film formation.

(E) Solvent

The composition for film formation according to the invention may include (E) a solvent.

According to the invention, the content of the (E) solvent in the composition for film formation is preferably 10 to 60 parts by mass, and more preferably 20 to 40 parts by mass, with respect to 100 parts by mass of the composition for film formation.

When the content of the solvent is in the range described above, it is preferable because the composition for film formation as a coating liquid can be applied uniformly on a support.

Regarding the (E) solvent, any solvent having a solubility in water of 5% by mass or more is preferably used, and any solvent that is freely miscible with water is more preferred. Therefore, a solvent selected from water and water-soluble solvents is preferred. Particularly, preferred examples of the water-soluble solvent include an alcohol-based solvent, and an ether-based solvent, an amide-based solvent, a ketone-based solvent, a sulfoxide-based solvent, a sulfone-based solvent, a nitrile-based solvent, and an organic phosphorus-based solvent, which are aprotic polar solvents. Water and an alcohol-based solvent are preferred, and examples of the alcohol-based solvent include methanol, ethanol, isopropanol, n-butanol, ethylene glycol, propylene glycol, diethylene glycol, and dipropylene glycol. Among the alcohol-based solvents, ethanol, isopropanol, n-butanol, and ethylene glycol are more preferred, and isopropanol is particularly preferred. These can be used singly, or in combination of two or more kinds thereof. It is preferable to use water only, or to use water and a water-soluble solvent in combination, and it is more preferable to use water only, or to use water and at least one alcohol-based solvent in combination. In regard to a combined use of water and a water-soluble solvent, isopropanol is used in an amount of preferably 0.1% to 10%, more preferably 0.5% to 5%, and even more preferably 1.0% to 2.0%, with respect to 100% by mass of water.

Furthermore, preferred examples of the aprotic polar solvent include dimethyl sulfoxide, dimethylimidazolidinone, sulfolane, N-methylpyrrolidone, dimethylformamide, acetonitrile, acetone, dioxane, tetramethylurea, hexamethylphosphorotriamide, pyridine, propionitrile, butanone, cyclohexanone, tetrahydrofuran, tetrahydropyran, ethylene glycol diacetate, and γ-butyrolactone, and among these, dimethyl sulfoxide, N-methylpyrrolidone, dimethylformamide, dimethylimidazolidinone, sulfolane, acetone, or acetonitrile, and tetrahydrofuran are preferred. These can be used singly or in combination of two or more kinds thereof, (F) Polymerization Inhibitor It is also preferable that the composition for film formation according to the invention includes a polymerization inhibitor in order to impart stability to the coating liquid when a film is formed.

Regarding the polymerization inhibitor, any known polymerization inhibitor can be used, and examples include a phenolic compound, a hydroquinone compound, an amine compound, and a mercapto compound.

Examples of the phenolic compound include hindered phenol (a phenol having a t-butyl group at the ortho-position, and representative examples include 2,6-di-t-butyl-4-methlyphenol), and bisphenol. Specific examples of the hydroquinone compound include monomethyl ether hydroquinone. Furthermore, specific examples of the amine compound include N-nitroso-N-phenylhydroxylamine and N,N-diethylhydroxylamine.

Meanwhile, these polymerization inhibitors may be used singly or in combination of two or more kinds thereof.

The content of the polymerization inhibitor is preferably 0.01 to 5 parts by mass, more preferably 0.01 to 1 part by mass, and even more preferably 0.01 to 0.5 parts by mass, with respect to 100 parts by mass of the total solid content mass of the composition for film formation.

[Other Components]

The composition for film formation according to the invention may include, in addition to the components (A) to (F), a surfactant, a polymeric dispersant, an anti-cratering agent, and the like.

[Surfactant]

For the composition for film formation according to the invention, various polymeric compounds can be added thereto in order to regulate the film properties. Examples of the polymeric compound that can be used include an acrylic polymer, a polyurethane resin, a polyamide resin, a polyester resin, an epoxy resin, a phenolic resin, a polycarbonate resin, a polyvinyl butyral resin, a polyvinyl formal resin, shellac, a vinylic resin, an acrylic resin, a rubber-based resin, waxes, and other naturally occurring resins. Also, two or more kinds of these compounds may be used in combination.

Furthermore, a nonionic surfactant, a cationic surfactant, an organic fluorocompound, and the like may also be added to the composition in order to regulate the liquid properties of the coating liquid, which is the composition for film formation.

Specific examples of the surfactant include anionic surfactants such as an alkyl benzenesulfonic acid salt, an alkyl naphthalenesulfonic acid salt, a higher fatty acid salt, a sulfonic acid salt of a higher fatty acid ester, a sulfuric acid ester salt of a higher alcohol ether, a sulfonic acid salt of a higher alcohol ether, an alkylcarboxylic acid salt of a higher alkyl sulfonamide, and an alkyl phosphoric acid salt; nonionic surfactants such as a polyoxyethylene alkyl ether, a polyoxyethylene alkyl phenyl ether, a polyoxyethylene fatty acid ester, a sorbitan fatty acid ester, an ethylene oxide adduct of acetylene glycol, an ethylene oxide adduct of glycerin, and a polyoxyethylene sorbitan fatty acid ester; and in addition to these, amphoteric surfactants such as an alkyl betaine and an amidobetaine, a silicon-based surfactant, and a fluorine-based surfactant. The surfactant can be appropriately selected from conventionally known surfactants and derivatives thereof

[Polymeric Dispersant]

The composition for film formation according to the invention may also include a polymeric dispersant.

Specific examples of the polymeric dispersant include polyvinylpyrrolidone, polyvinyl alcohol, polyvinyl methyl ether, polyethylene oxide, polyethylene glycol, polypropylene glycol, and polyacrylamide, and among these, it is preferable to use polyvinylpyrrolidone.

[Anti-Cratering Agent]

An anti-cratering agent is also referred to as a surface regulating agent, a leveling agent, or a slipping agent, and is intended to prevent surface irregularity of a film surface. Examples thereof include compounds having structures of an organically modified polysiloxane (mixture of a polyethersiloxane and a polyether), a polyether-modified polysiloxane copolymer, and a silicon-modified copolymer.

Examples of commercially available products thereof include TEGO GLIDE 432, TEGO GLIDE 110, TEGO GLIDE 110, 1EGO GLIDE 130, TEGO GLIDE 406, TEGO GLIDE 410, TEGO GLIDE 411, TEGO GLIDE 415, TEGO GLIDE 420, TEGO GLIDE 435, TEGO GLIDE 440, TEGO GLIDE 450, TEGO GLIDE 482, TEGO GLIDE A115, TEGO GLIDE B 1484, and TEGO GLIDE ZG400 (all trade names), manufactured by Evonik Industries.

The proportion of the anti-cratering agent is preferably 0 to 10 parts by mass, more preferably 0 to 5 parts by mass, and even more preferably 1 to 2 parts by mass, with respect to 100 parts by mass of the total solid content mass of the composition for film formation.

In addition to those described above, the composition for film formation according to the invention may optionally further include, for example, a viscosity increasing agent and an antiseptic agent.

<Support>

Many technologies can be utilized in order to increase the mechanical strength of the film. For example, a support can be used as a reinforcing material of the film, and preferably, a porous support can be used. This porous support may be used to constitute a portion of the film by applying the composition for film formation on this porous support, and/or impregnating the porous support with the composition for film formation, and then subjecting the composition to a polymerization curing reaction.

Examples of the porous support as a reinforcing material include a synthetic woven fabric, a synthetic nonwoven fabric, a spongy film, and a film having fine through-holes. Examples of the material that forms the porous support of the invention include a polyolefin (polyethylene, polypropylene, or the like), polyacrylonitrile, polyvinyl chloride, a polyester, a polyamide, and copolymers thereof. Alternatively, examples of the porous support include porous films based on a polysulfone, a polyether sulfone, polyphenylene sulfone, polyphenylene sulfide, a polyimide, a polyethermide, a polyamide, a polyamideimide, polyacrylonitrile, a polycarbonate, a polyacrylate, cellulose acetate, polypropylene, poly(4-methyl-1-pentene), polyvinylidene fluoride, polytetrafluoroethylene, polyhexafluoropropylene, polychlorotrifluoroethylene, and copolymers thereof. Among these, according to the invention, a polyolefin is preferred.

Commercially available porous supports and reinforcing materials are marketed by, for example, Japan Vilene Co., Ltd., Freudenberg Filtration Technologies (Novatexx materials), and Sefar AG Meanwhile, in a case in which a photopolymerization curing reaction is carried out, the porous support and the reinforcing material are required not to shield the wavelength region of the irradiated light, that is, required to transmit the radiation at the wavelength used for photopolymerization and curing; however, in the case of thermal polymerization and curing, it is not necessary to consider this factor. Furthermore, it is preferable that a porous reinforcing material is capable of causing the composition for film formation to penetrate thereinto.

It is preferable that the porous support is hydrophilic. Regarding a technique for imparting hydrophilicity to the support, general methods such as a corona treatment, an ozone treatment, a sulfuric acid treatment, and a silane coupling agent treatment can be used.

[Method for Producing Polymer Functional Film]

Next, a method for producing the polymer functional film of the invention is explained.

The method for producing the polymer functional film of the invention forms a film by polymerizing and curing a composition for film formation including (A) a styrene-based monomer represented by Formula (HSM), (B) a crosslinking agent represented by Formula (CL), and (C) a polymerization initiator represented by Formula (PI-1) or (PI-2).

According to the invention, it is preferable to produce a film such that the pore volume fraction of the film is preferably 0.1% to 2.0%, more preferably 0.1% to 1.5%, and particularly preferably 0.1% to 1.0%.

The pore volume fraction of the film can be adjusted by means of the amount of the crosslinking agent and the solid content concentration.

When the pore volume fraction of the film is in the range described above, it is preferable because there occurs an effect that the percentage of water content of the film is decreased, and salt leakage is suppressed.

It is preferable that the composition for film formation further includes (D) a polymerization initiator represented by Formula (AI).

It is more preferable that the composition for film formation further includes (E) a solvent, and the content of the solvent is preferably 5 to 50 parts by mass, and more preferably 20 to 40 parts by mass, with respect to 100 parts by mass of the total mass of the composition for film formation.

Furthermore, the (E) solvent is preferably water or a water-soluble solvent, and it is preferable to apply the composition for film formation on a support, and/or to impregnate the support with the composition, and then to perform a polymerization curing reaction. Furthermore, it is preferable that the polymerization curing reaction is a curing reaction in which the composition for film formation is polymerized by irradiating the composition with energy radiation, or by irradiating the composition with energy radiation and heating the composition. Furthermore, it is preferable to perform heating before the composition for film formation is irradiated with energy radiation, or to perform heating on a film formed by irradiation with energy radiation.

[Heating Temperature and Time]

The heating temperature according to the invention is preferably 40° C. to 120° C., more preferably 60° C. to 100° C., and particularly preferably 75° C. to 90° C.

The heating time in the case of heating before irradiation with energy radiation is preferably 10 seconds to 1 hour, more preferably 10 seconds to 30 minutes, and particularly preferably 10 seconds to 10 minutes.

The heating time in the case of heating at the time of irradiation with energy radiation is not particularly limited, and the heating time may be more than or equal to the total time of the heating time taken until a porous support containing the composition for forming a polymer functional film to an overheating temperature, and the time taken thereafter to irradiate the composition with energy radiation.

The heating time in the case of heating after irradiation with energy radiation is preferably 1 minute to 12 hours, more preferably 1 minute to 8 hours, and particularly preferably 1 minute to 6 hours.

Hereinafter, the method for producing the polymer functional film of the invention will be described in detail.

The polymer functional film of the invention can be produced in a batch manner (batch system) using a fixed support; however, the film can also be produced in a continuous manner (continuous system) using a mobile support. The support may have a roll shape that is continuously wound. Meanwhile, in the case of a continuous system, a process of mounting a support on a continuously moving belt, and forming a film by performing continuous application of a coating liquid as the composition for film formation, followed by polymerization and curing, can be continuously carried out. However, only any one of the application process and the film forming process may be carried out continuously.

Meanwhile, separately from the support, a temporary support (after completion of the polymerization curing reaction, the film is peeled off from the temporary support) may be used until the porous support is impregnated with the composition for film formation and the polymerization curing reaction is completed.

Regarding such a temporary support, it is not necessary to consider material permeation, and any support may be used as long as it can be fixed for film formation, including, for example, a polyethylene terephthalate (PET) film or a metal plate such as an aluminum plate.

Furthermore, a porous support may be impregnated with the composition for film formation, and the composition may be polymerized and cured without using a support other than the porous support.

The composition for film formation can be applied on or impregnated into the porous support by various methods, for example, curtain coating, extrusion coating, air knife coating, slide coating, nip roll coating, forward roll coating, reverse roll coating, immersion coating, kiss coating, rod bar coating, or spray coating. Application of plural layers may be carried out simultaneously or continuously. In order to perform simultaneous application of plural layers, curtain coating, slide coating, slot die coating, and extrusion coating are preferred.

Production of a polymer functional film by a continuous system is carried out continuously by applying the composition for film formation on a moving support, and more preferably by means of a production unit which includes a film-forming composition applying unit; a radiation source for polymerizing and curing the composition for film formation; a film collecting unit for collecting a formed film; and a means for moving the support from the film-forming composition applying unit to the radiation source and the film collecting unit.

In the present Production Example, the polymer functional film of the invention is produced through the processes of (i) applying the composition for film formation for forming the film of the invention on a porous support, and/or impregnating the porous support with the composition, (ii) subjecting the composition for film formation to a polymerization curing reaction by irradiation with energy radiation and/or heating, and (iii) detaching the film from the support, if desired.

Meanwhile, for the item (ii), heating may be carried out before light irradiation, may be carried out simultaneously with light irradiation, or may be carried out on the film which is formed by light irradiation.

[Irradiation with Energy Radiation]

In the production unit described above, the film-forming composition applying unit is provided at a position upstream of the radiation source, and the radiation source is placed at a position upstream of the film collecting unit.

In order to have fluidity that is sufficient for application with a high speed coating machine, the viscosity at 35° C. of the composition for film formation according to the invention is preferably 4000 mPa·s, more preferably 1 to 1000 mPa·s, and most preferably 1 to 500 mPa·s. In the case of slide bead coating, the viscosity at 35° C. is preferably 1 to 100 mPa·s.

With a high speed coating machine, the coating liquid, which is the composition for film formation according to the invention, can be applied on a moving support at a speed of more than 15 m/min, and can also be applied at a speed of more than 400 m/min.

Particularly, in a case in which it is intended that the support is left on the film to obtain mechanical strength, this support may be subjected to a corona discharge treatment, a glow discharge treatment, a flaming treatment, an ultraviolet irradiation treatment or the like, for example, in order to improve wettability and adhesive force of the support, before the composition for film formation according to the invention is applied on the support and/or the support is impregnated with the composition.

During the polymerization curing reaction, the (A) styrene-based monomer represented by Formula (HSM) and the (B) crosslinking agent represented by Formula (CL) are polymerized and cured, and thus a polymer is formed. The polymerization curing reaction can be carried out by irradiation with energy radiation and/or by heating, under the conditions in which polymerization and curing occurs with rapidity that is sufficient for forming a film within 5 minutes to 1 hour.

Polymerization and curing of the composition for film formation according to the invention is initiated preferably within 60 seconds, more preferably within 15 seconds, particularly preferably within 5 seconds, and most preferably within 3 seconds, after the composition for film formation is applied on the support.

Irradiation with energy radiation for polymerization and curing is carried out preferably for less than 10 minutes, more preferably less than 5 minutes, and particularly preferably less than 3 minutes. In a continuous method, irradiation is carried out continuously, and the polymerization curing reaction time is determined in consideration of the speed at which the composition for film formation passes through the irradiated beam and moves.

In the case of using high intensity ultraviolet radiation (UV light) for the polymerization curing reaction, a significant amount of heat is generated. Therefore, in order to prevent overheating, it is preferable to cool the lamp of the light source and/or the support/film with cooling air or the like. In a case in which a noticeable dose of infrared light (IR light) is irradiated together with a UV beam, the UV light is irradiated using an IR-reflective quartz plate as a filter.

The energy radiation is preferably ultraviolet radiation. The irradiation wavelength is preferably any wavelength which conforms to the absorption wavelength of any polymerization initiator included in the composition for film formation, and examples thereof include UV-A (400 to 320 nm), UV-B (320 to 280 nm), and UV-C (280 to 200 nm).

Examples of the ultraviolet radiation source include a mercury arc lamp, a carbon arc lamp, a low pressure mercury lamp, a medium pressure mercury lamp, a high pressure mercury lamp, a swirl-flow plasma arc lamp, a metal halide lamp, a xenon lamp, a tungsten lamp, a halogen lamp, a laser, and an ultraviolet emitting diode. A medium pressure or high pressure mercury vapor type ultraviolet light emitting lamp is particularly preferred. In addition to this, in order to modify the light emission spectrum of the lamp, additives such as a metal halide may be incorporated. A lamp having the maximum emission at 200 to 450 nm is particularly suitable.

The energy output of the radiation source is preferably 3 to 200 W/cm$^2$, and more preferably 10 to 200 W/cm$^2$; however, the energy output may be higher than this range or lower than this range as long as a desired exposure dose can be realized. The exposure intensity is one of the parameters which can be used in order to control the degree of polymerization curing that affects the final structure of the film. The exposure dose is measured by a High Energy UV Radiometer (UV Power Puck™ from EIT Instrument Markets, Inc.), in the UV-A range indicated by the relevant apparatus, and the exposure dose is preferably at least 1000 mJ/cm$^2$ or more, more preferably 3,000 to 40,000 mJ/cm$^2$, and particularly preferably 5,000 to 30,000 mJ/cm$^2$.

In the case of a fast coating speed, it is preferable to use plural light sources in order to obtain a required exposure dose. In this case, these plural light sources may have identical or different exposure intensities.

The polymer functional film of the invention is primarily intended to be used particularly for ion exchange. However, the polymer functional film of the invention is not intended to be limited to ion exchange, and it is considered that the polymer functional film can also be suitably used for reverse osmosis and gas separation.

EXAMPLES

Hereinafter, the invention will be explained in more detail by way of Examples, but the invention is not intended to be limited to these Examples. Meanwhile, unless particularly stated otherwise, units "parts" and "percent (%)" are on a mass basis.

[Synthesis of (B) crosslinking agent represented by Formula (CL)]

Synthesis Example 1

1,4-Diazabicyclo[2.2.2]octane (1.00 mol, manufactured by Wako Pure Chemical Industries, Ltd.) was added to a mixed solution of 321 g of chloromethylstyrene (2.10 mol, CMS-P manufactured by AGC Seimi Chemical Co., Ltd.), 1.30 g of 2,6-di-t-butyl-4-methylphenol (manufactured by Wako Pure Chemical Industries, Ltd.), and 433 g of acetonitrile, and the mixture was heated and stirred for 15 hours at 80° C.

Crystals thus produced were filtered, and 405 g (yield 97%) of white crystals of an exemplary compound (CL-1) were obtained.

Synthesis Example 2

130 g of N,N,N',N'-tetramethyl-1,3-diaminopropane (1.00 mol, manufactured by Tokyo Chemical Industry Co., Ltd.) was added to a mixed solution of 458 g of chloromethylstyrene (3.00 mol, CMS-P manufactured by AGC Seimi Chemical Co., Ltd.), 1.85 g of 2,6-di-t-butyl-4-methylphenol (manufactured by Wako Pure Chemical Industries, Ltd.), and 1232 g of nitrobenzene, and the mixture was heated and stirred for 20 hours at 80° C.

Crystals thus produced were filtered, and 218 g (yield 50%) of white crystals of an exemplary compound (CL-8) were obtained.

An exemplary monomer (SM-1) (manufactured by Sigma-Aldrich Co.) was used as the (A) styrene-based monomer represented by Formula (HSM); the synthesized exemplary compounds (CL-1) and (CL-8) were used as the (B) crosslinking agent represented by Formula (CL); an exemplary compound (P1-1-1) (manufactured by BASF Japan, Ltd., trade name: DAROCUR 1173 (2-hydroxy-2-methyl-1-phenylpropan-1-one) or an exemplary compound (PI-1-2) (manufactured by BASF Japan, Ltd., trade name: IRGACURE 2959 (1-[4-(2-hydroxyethoxy)-phenyl]-2-hydroxy-2-methyl-1-propan-1-one)) was used as the (C) polymerization initiator represented by Formula (PI-1); an exemplary compound (AI-3) (manufactured by Wako Pure Chemical Industries, Ltd., trade name: VA-046B)) was used as the (D) polymerization initiator represented by Formula (AI); and water was used as the (E) solvent.

Furthermore, in Comparative Examples, divinylbenzene (DVB, manufactured by Wako Pure Chemical Industries, Ltd.) or polyethylene glycol 200 diacrylate (PEG200DA, manufactured by Shin Nakamura Chemical Co., Ltd.) was used as a crosslinking agent, and N-methylpyrrolidone (NMP, manufactured by Wako Pure Chemical Industries, Ltd.) was used as a solvent.

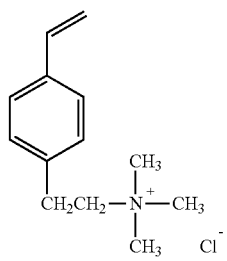
(SM-1)

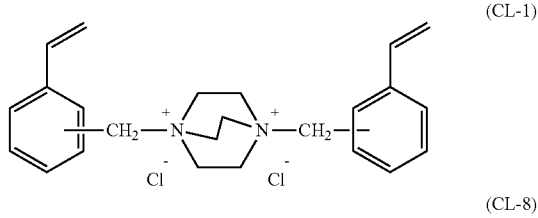
(CL-1)

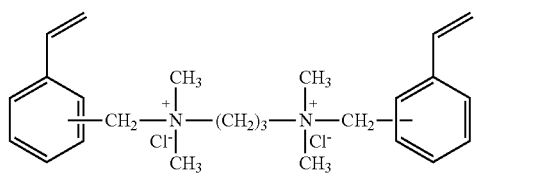
(CL-8)

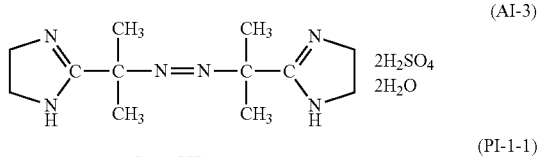
(AI-3)

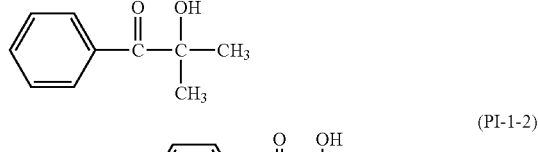
(PI-1-1)

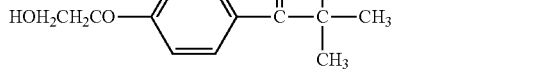
(PI-1-2)

Example 1

(Production of Anion Exchange Membrane)

A coating liquid of a composition having the composition (unit: g) indicated in the following Table 1 was applied manually on an aluminum plate at a speed of about 5 m/min, using a rod wound with a 150-μm wire. Subsequently, a nonwoven fabric (FO-2223-10 manufactured by Freudenberg Group, thickness 100 μm) was impregnated with the coating liquid. Any excess coating liquid was removed using a rod that was not wound with a wire. The temperature of the coating liquid at the time of application was about 25° C. (room temperature). The support impregnated with the coating liquid was subjected to a polymerization curing reaction using a UV exposure machine (manufactured by Fusion UV Systems, Inc., type Light Hammer 10, D-valve, conveyor speed 9.5 m/min, and 100% intensity). Thus, an anion exchange membrane was produced. The amount of exposure was 1,000 mJ/cm$^2$ in the UV-A region. The film thus obtained was detached from the aluminum plate, and was stored for at least 12 hours in a 0.1 M aqueous NaCl solution.

Examples 2 to 10

Anion exchange membranes of Examples 2 to 10 were produced in the same manner as in Example 1, except that the composition used in the production of the anion exchange membrane of Example 1 was changed to the compositions described in the following Table 1.

Comparative Examples 1 to 4

Anion exchange membranes of Comparative Examples 1 to 4 were respectively produced in the same manner as in Example 1, except that the composition used in the production of the anion exchange membrane of Example 1 was changed to the compositions described in the following Table 1, and the polymerization conditions were set to the conditions described in the following Table 2.

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Styrene-based monomer represented by Formula (HSM) | SM-1 | 23.2 | 32.1 | 8.3 | 23.2 | 23.0 | 23.0 | 23.0 | 32.1 | 8.3 | 23.0 |
| Crosslinking agent | CL-1 | 46.1 | 37.2 | 61.0 | 46.1 | 46.1 | 46.1 | | | | |
| | CL-8 | | | | | | | 46.1 | 37.2 | 61.0 | 46.1 |
| | DVB | | | | | | | | | | |
| | PEG200DA | | | | | | | | | | |
| Polymerization initiator | Irgacure 2959 | 0.7 | 0.7 | 0.7 | | 0.7 | | 0.7 | 0.7 | 0.7 | |
| | Darocur 1173 | | | | 0.7 | | | | | | 0.7 |
| | VA-46B | | | | | | 0.2 | 0.2 | | | |
| Solvent | Water | 30.0 | 30.0 | 30.0 | 30.0 | 30.0 | 30.0 | 30.0 | 30.0 | 30.0 | 30.0 |
| | NMP | | | | | | | | | | |

| | | Comparative Example 1 | Comparative Example 2 | Comparative Example 3 | Comparative Example 4 |
|---|---|---|---|---|---|
| Styrene-based monomer represented by Formula (HSM) | SM-1 | 32.7 | 53.8 | 32.7 | 23.2 |
| Crosslinking agent | CL-1 | | | | 46.1 |
| | CL-8 | | | | |
| | DVB | | 15.5 | | |
| | PEG200DA | 36.6 | | 36.6 | |
| Polymerization initiator | Irgacure 2959 | 0.7 | 0.7 | | |
| | Darocur 1173 | | | | |
| | VA-46B | | | 0.7 | 0.7 |
| Solvent | Water | 30.0 | 20.0 | 30.0 | 30.0 |
| | NMP | | 10.0 | | |

TABLE 2

| | Example 1 | Example 2 | Example 3 | Example 4 | Example 5 | Example 6 | Example 7 | Example 8 | Example 9 | Example 10 |
|---|---|---|---|---|---|---|---|---|---|---|
| Polymerization curing method | UV irradiation | UV irradiation | UV irradiation | UV irradiation | UV irradiation | UV irradiation | UV irradiation | UV irradiation | UV irradiation | UV irradiation |
| Time required for polymerization curing reaction | 5 min | 5 min | 5 min | 5 min | 3 min | 3 min | 5 min | 5 min | 5 min | 5 min |
| Heating temperature | | | | | | | | | | |

| | Comparative Example 1 | Comparative Example 2 | Comparative Example 3 | Comparative Example 4 |
|---|---|---|---|---|
| Polymerization curing method | UV irradiation | UV irradiation | Heating | Heating |
| Time required for polymerization curing reaction | 5 minutes | 15 minutes | 5 hours | 5 hours |
| Heating temperature | | | 80° C. | 80° C. |

For the anion exchange membranes produced in Examples 1 to 10 and Comparative Examples 1 to 4, the following items were evaluated. The results are presented in the following Table 3.

[Percentage of Water Content (%)]

The percentages of water content of the membranes were calculated by the following expression:

{(Membrane mass after immersion for 15 hours in a 0.5 M aqueous NaCl solution at 25° C.)−(membrane mass after drying for 15 hours in a vacuum oven at 60° C. after immersion)}/ (membrane mass after immersion for 15 hours in 0.5 M aqueous NaCl solution at 25° C.)×100

[Electrical Resistance of Film ($\Omega \cdot cm^2$)]

Two surfaces of a film that had been immersed in a 0.5 M aqueous NaCl solution (25° C.) for about 2 hours were wiped with dry filter paper, and the film was inserted into a two-chamber type cell (effective film area 1 cm$^2$, a Ag/AgCl reference electrode (manufactured by Metrohm AG) was used as an electrode). The two chambers were each filled with 100 mL of NaCl at the same concentration, and the cell was left to stand in a thermostat water bath at 25° C. until equilibrium was achieved. After the temperature of the liquid in the cell reached exactly 25° C., the electrical resistance $r_1$ was measured using an alternating current bridge (frequency 1,000 Hz). The NaCl concentration for measurement was set to 0.5 M, 0.7 M, 1.5 M, 3.5 M, and 4.5 M, and the electrical resistance was measured in sequence from the lowest concentration liquid. Next, the film was removed, and the electrical resistance $r_2$ between two electrodes was measured using a 0.5 M aqueous NaCl solution only. Thus, the electrical resistance of the film, R, was determined by calculating $r_1-r_2$.

[Pore Volume Fraction (%) of Film]

The electrical conductivity of the film, A (S/cm$^2$), was calculated by the following equation (a), from the electrical resistances of the film, R, measured with aqueous NaCl solutions (25° C.) at 0.5 M, 0.7 M, 1.5 M, 3.5 M, and 4.5 M.

$$A(S/cm^2)=1/R \qquad \text{Equation (a)}$$

Next, the electrical conductivity of the aqueous solution of each NaCl concentration and the film thickness were measured, and the solution conductivity per unit film thickness of the aqueous solution of each NaCl concentration, B (S/cm$^2$), was calculated. When a graph was produced by plotting this electrical conductivity A of the film on the y-axis, and plotting the solution conductivity per unit film thickness B of the aqueous solutions of various NaCl concentrations on the x-axis, the y-intercept of a fitted curve of the plot thus obtained was designated as C, and the pore volume fraction (%) was calculated by the following equation (b):

$$\text{Pore volume fraction}=(A-C)/B \qquad \text{Equation (b)}$$

[SEM Analysis Conditions]

A film for analysis was coated with Pt at a thickness of 1.5 nm, and an analysis was carried out under the following conditions.

Acceleration voltage: 2 kV
Operating distance: 4 mm
Aperture: 4
Magnification: ×100,000 times
Inclination of field of view: 3°

[Coefficient of Water Permeability (mL/m$^2$/Pa/hr)]

The coefficient of water permeability of a film was measured using an apparatus having a flow path 10 as illustrated in FIG. 1. In FIG. 1, reference numeral 1 represents a film, and reference numerals 3 and 4 represent the flow paths for a feed solution (pure water) and a draw solution (3M NaCl), respectively. The arrow of reference numeral 2 indicates the flow of water separated from the feed solution.

400 mL of a feed solution and 400 mL of a draw solution were brought into contact via a film (film contact area 18 cm$^2$), and the respective liquids were caused to flow in the direction of the arrow of reference numeral 5 at a flow rate of 0.11 cm/second using a peristaltic pump. The rate at which water in the feed solution infiltrated into the draw solution through the film was analyzed by measuring the masses of the feed solution and the draw solution in real time, and thus the coefficient of water permeability was determined.

TABLE 3

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Percentage of water content (%) | 30.0 | 35.0 | 25.0 | 35.0 | 25.0 | 30.0 | 25.0 | 32.0 | 22.0 | 25.0 |
| Coefficient of water permeability (mL/m$^2$/Pa/hr) × 10$^{-5}$ | 5.7 | 6.3 | 3.5 | 6.2 | 5.0 | 5.2 | 4.5 | 5.3 | 3.0 | 4.3 |
| Pore volume fraction (%) | 0.6 | 0.9 | 0.1 | 0.9 | 0.5 | 0.3 | 0.5 | 0.8 | 0.1 | 0.5 |

|  | Comparative Example 1 | Comparative Example 2 | Comparative Example 3 | Comparative Example 4 |
|---|---|---|---|---|
| Percentage of water content (%) | 70.0 | 50.0 | 70.0 | 45.0 |
| Coefficient of water permeability (mL/m$^2$/Pa/hr) × 10$^{-5}$ | 16.0 | 9.0 | 15.0 | 7.0 |
| Pore volume fraction (%) | 2.8 | 1.5 | 2.7 | 1.0 |

As can be seen from the results of Table 3, the anion exchange membranes of Examples 1 to 10 that satisfied the requirements of the invention exhibited both a low percentage of water content and a low coefficient of water permeability, and it was considered that the anion exchange membranes were high performance anion exchange membranes. In contrast, the anion exchange membranes of Comparative Examples 1 to 4 that did not satisfy the requirements of the invention exhibited a high percentage of water content and a high coefficient of water permeability.

The invention has been explained together with embodiments thereof; however, it is not intended to limit the explanation of the invention in any specific parts unless particularly stated otherwise, and it is contemplated that the invention and the embodiments should be construed broadly without contradicting the spirit and scope of the invention disclosed in the attached claims.

EXPLANATION OF REFERENCES

1: film
2: arrow indicating infiltration of water in feed solution to draw solution through film
3: flow path of feed solution
4: flow path of draw solution
5: direction of movement of liquid
10: flow path of analytic apparatus for coefficient of water permeability

What is claimed is:

1. A polymer functional film, obtained by polymerizing and curing a composition comprising: (A) a styrene-based monomer represented by the following Formula (HSM); (B) a crosslinking agent represented by the following Formula (CL); and (C) a polymerization initiator represented by the following Formula (PI-1) or (PI-2):

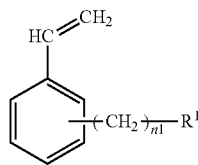

Formula (HSM)

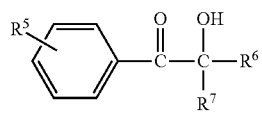

Formula (CL)

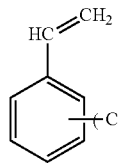

Formula (PI-1)

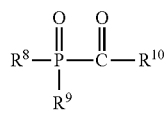

Formula (PI-2)

wherein in Formula (HSM), $R^1$ represents a halogen atom or $-N^+(R^2)(R^3)(R^4)(V)$; n1 represents an integer from 1 to 10; wherein $R^2$ to $R^4$ each independently represent a linear or branched alkyl group, or an aryl group; $R^2$ and $R^3$, or $R^2$, $R^3$ and $R^4$ may be bonded to each other and form an aliphatic heterocyclic ring together with N atom; $X_1^-$ represents an organic or inorganic anion;

in Formula (CL), $L^1$ represents an alkylene group or an alkenylene group; Ra, Rb, Rc and Rd each independently represent an alkyl group or an aryl group; in a case where Ra and Rb are an alkyl group, Ra and Rb are bonded to each other and form a ring, in a case where Rc and Rd are an alkyl group, Rc and Rd are bonded to each other and form a ring, and in a case where both Ra and Rb are an alkyl group and Rc and Rd are an alkyl group, both Ra and Rb are bonded to each other and form a ring and Rc and Rd are bonded to each other and form a ring; n2 and n4 each independently represent an integer from 1 to 10; $X_2^-$ and $X_3^-$ each independently represent an organic or inorganic anion;

in Formula (PI-1), $R^5$ represents a hydrogen atom, an alkyl group, an alkenyl group, an alkoxy group, or an aryloxy group; $R^6$ and $R^7$ each independently represent a hydrogen atom, an alkyl group, an alkenyl group, an alkoxy group, or an aryloxy group; $R^6$ and $R^7$ may be bonded to each other and form a ring; and in Formula (PI-2), $R^8$ represents an alkyl group, an aryl group, an alkylthio group, or an arylthio group; $R^9$ represents an alkyl group, an aryl group, an alkylthio group, an arylthio group, or an acyl group; and $R^{10}$ represents an alkyl group or an aryl group.

2. The polymer functional film according to claim 1, wherein the composition further comprises (D) a polymerization initiator represented by the following Formula (AI):

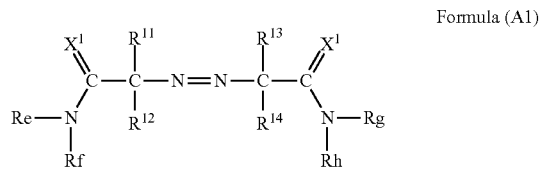

Formula (AI)

wherein in formula (AI), $R^{11}$ to $R^{14}$ each independently represent an alkyl group; $X^1$ represents =O or =N—Ri; Re to Ri each independently represent a hydrogen atom or an alkyl group; and Re and Rf, Rg and Rh, Re and Ri, and Rg and Ri may be bonded to each other and form a ring.

3. The polymer functional film according to claim 1, wherein the content of the (A) styrene-based monomer represented by Formula (HSM) is 1 to 85 parts by mass with respect to 100 parts by mass of the total solid content of the composition.

4. The polymer functional film according to claim 1, wherein the content of the (B) crosslinking agent represented by Formula (CL) is 10 to 98 parts by mass with respect to 100 parts by mass of the total solid content of the composition.

5. The polymer functional film according to claim 1, wherein the content of the (C) polymerization initiator represented by Formula (PI-1) or (PI-2) is 0.1 to 20 parts by mass with respect to 100 parts by mass of the total solid content of the composition.

6. The polymer functional film according to claim 2, wherein the content of the (D) polymerization initiator represented by Formula (AI) is 0.1 to 20 parts by mass with respect to 100 parts by mass of the total solid content of the composition.

7. The polymer functional film according to claim 1, wherein the composition comprises (E) a solvent.

8. The polymer functional film according to claim 7, wherein the (E) solvent is water or a water-soluble solvent.

9. The polymer functional film according to claim 1, comprising a support.

10. The polymer functional film according to claim 9, wherein the support is a synthetic woven fabric, a synthetic nonwoven fabric, a spongy film, or a film having fine through-holes.

11. The polymer functional film according to claim 9, wherein the support is formed of a polyolefin.

12. The polymer functional film according to claim 1, wherein the polymer functional film is an ion exchange membrane, a reverse osmosis membrane, a forward osmosis membrane, or a gas separation membrane.

13. The polymer functional film according to claim 1, wherein the pore volume fraction of the polymer functional film is 0.1% to 0.9%.

14. The polymer functional film according to claim 1, wherein Ra and Rb are bonded to each other and form a piperazine ring or a dihydropyrazine ring together with $L^1$.

15. The polymer functional film according to claim 1, wherein both Ra and Rb are bonded to each other and Rc and Rd are bonded to each other, and Ra, Rb, Rc, and Rd form a triethylenediamine ring together with $L^1$.

* * * * *